(12) United States Patent
Meininghaus

(10) Patent No.: US 7,682,640 B2
(45) Date of Patent: Mar. 23, 2010

(54) PROCESS FOR PRODUCING BAKED BREAD CRUMB PRODUCT AND BAKED BREAD CRUMB PRODUCT

(76) Inventor: Dirk Meininghaus, Von Oer Strasse 4, D-59229 Ahlen (DE)

( * ) Notice: Subject to any disclaimer, the term of this patent is extended or adjusted under 35 U.S.C. 154(b) by 1036 days.

(21) Appl. No.: 11/036,481

(22) Filed: Jan. 13, 2005

(65) Prior Publication Data

US 2005/0186318 A1    Aug. 25, 2005

Related U.S. Application Data

(63) Continuation-in-part of application No. 10/106,144, filed on Mar. 26, 2002, now abandoned.

(30) Foreign Application Priority Data

Nov. 26, 2001   (DE) ................................ 101 57 608

(51) Int. Cl.
   *A23L 1/176*   (2006.01)
(52) U.S. Cl. .......................... 426/96; 426/99; 426/443; 426/560; 426/652; 426/653
(58) Field of Classification Search ....................... None
See application file for complete search history.

(56) References Cited

U.S. PATENT DOCUMENTS

| 4,068,009 | A |   | 1/1978 | Rispoli et al. |
| 4,344,978 | A |   | 8/1982 | Sharpe et al. |
| 4,640,837 | A |   | 2/1987 | Coleman et al. |
| 5,565,227 | A |   | 10/1996 | Mason et al. |
| 6,858,241 | B1 | * | 2/2005 | Kershman et al. ............. 426/94 |

FOREIGN PATENT DOCUMENTS

| EP | 0 237 162 B1 | 9/1987 |
| EP | 0 360 881 A1 | 4/1990 |

* cited by examiner

*Primary Examiner*—Lien Tran
(74) *Attorney, Agent, or Firm*—Laurence A. Greenberg; Werner H. Stemer; Ralph E. Locher

(57) ABSTRACT

A process for producing a baked bread crumbs product includes the first step of baking bread crumbs with added sugar, mixing vegetable fat with the bread crumbs-sugar baked mixture to form an intermediate product, and then roasting the intermediate product. A baked bread crumbs product includes a mixture of bread crumbs and sugar baked together forming a baked mixture, and a mixture of vegetable fat and the baked mixture forming an intermediate product, the intermediate product being roasted and having a reddish-brown coloration characteristic of frying.

16 Claims, No Drawings

PROCESS FOR PRODUCING BAKED BREAD CRUMB PRODUCT AND BAKED BREAD CRUMB PRODUCT

CROSS-REFERENCE TO RELATED APPLICATIONS

This is a continuation-in-part application of application Ser. No. 10/106,144, filed Mar. 26, 2002 now abandoned; the application also claims the priority, under 35 U.S.C. §119, of German patent application No. 101 57 608.0, filed Nov. 26, 2001; the prior applications are herewith incorporated by reference in their entirety.

BACKGROUND OF THE INVENTION

Field of the Invention

The invention relates to a process for producing a baked bread crumb product and a baked bread crumb product produced by the process. This product can also be referred to as a bread crumb product for use in a baking oven.

The process and the bread crumb product produced by the process are not in the prior art. Products that can be baked in an oven have been precooked to date by deep-fat frying in a fat bath at temperatures of approximately 160° C. to 170° C. and, as a result, have a fat content of approximately 15%, measured in the coating. The products thus treated can only be baked in an oven as a result of the fat content because a "dry" outer coating could not assume the desired function. This is because the bread crumb requires a mediator to conduct further the heat acting on the product to ensure complete cooking in the baking oven. In addition, the open structure of the bread crumb must be encapsulated against a baking oven off-taste that typically occurs and has an adverse effect on the product. The encapsulation is primarily to be achieved with fat that penetrates the porous bread crumb structure and fulfills the above-described functions. In addition, the fat prevents burning of the dry product, especially in an edge region.

A disadvantage of these prior art processes is the overall high energy consumption for the production of products treated with bread crumb, which is required for the deep-fat frying and for the exhaust air cleanup and subsequent cooling to the starting temperature. In particular, procurement and maintenance of the deep-fat fryers, together with running costs for fat, disposal of the waste fat, and the necessary exhaust air combustion systems, which must be operated with high energy consumption and constant servicing or maintenance, are extremely cost-intensive, so that, together with costs for cooling, up to 15 to 20% of increased production costs are reached. The cooking loss due to deep-fat frying and cooling is further approximately 10% of the starting product, depending on the temperature and cooking time chosen. The product treated with such prior art bread crumb, in order to obtain a reddish-brown coloring characteristic of frying, must then be pre-baked, which requires further usage of energy.

SUMMARY OF THE INVENTION

It is accordingly an object of the invention to provide a process for producing a baked bread crumb product and a baked bread crumb product produced by the process that overcomes the hereinafore-mentioned disadvantages of the heretofore-known devices and methods of this general type and that is considerably more economical to carry out, and that offers a bread crumb product prepared considerably more conveniently by the end user.

With the foregoing and other objects in view, there is provided in accordance with the invention, a process for producing a baked bread crumb product including the steps of baking bread crumbs with sugar to form a baked mixture, subsequently mixing vegetable fat with the baked mixture to form an intermediate product, and roasting the intermediate product to produce a reddish-brown coloration characteristic of frying.

By mixing the bread crumbs with sugar in a first process step and baking it, then, in a second process step adding vegetable fat and mixing it therewith, and in a following third process step roasting it, a baked bread crumb product is provided that, as a result of the sugar content, obtains the desired reddish-brown coloration characteristic of frying so that a product treated therewith can be baked immediately in the actual cooking process to give the finished product by large-scale consumers such as restaurants, snack stands, large-scale kitchens, catering enterprises, or airlines. As a result, a second heating of a product can be avoided.

Advantageously, products treated with the bread crumb according to the invention can be baked to give the finished product in convection baking ovens, as are increasingly being used in more and more catering enterprises. Furthermore, the considerably decreased fat content in the baked bread crumb product is of particular advantage, compared with the coating of a deep-fat fried product. Thus, healthier nutrition results from use of the product of the invention. In addition, the strong odor nuisance, and also fouling of pans and deep-fat fryers is entirely avoided because these are no longer required.

In accordance with another mode of the invention, the reddish-brown coloration is produced because of the presence of the sugar.

In accordance with a further mode of the invention, the bread crumbs is extra dry bread crumbs.

In accordance with an added mode of the invention, an amount of the sugar in the baking step is between approximately 2 and approximately 6 percent by weight of the amount of the bread crumbs, preferably, approximately 4 percent by weight of the amount of the bread crumbs.

In accordance with an additional mode of the invention, the baking step is carried out for between approximately 25 and approximately 50 minutes at between approximately 215° C. to approximately 245° C., preferably, for approximately 40 minutes at approximately 230° C.

In accordance with yet another mode of the invention, an amount of the vegetable fat added in the mixing step is between approximately 14 and approximately 23 percent by weight of the baked mixture, preferably, 17 percent by weight of the baked mixture.

In accordance with yet a further mode of the invention, the roasting step is carried out in a continuous-flow drying system.

In accordance with yet an added mode of the invention, the roasting step is carried out for between approximately 10 and approximately 30 minutes at between approximately 140° C. and approximately 180° C., preferably, for approximately 20 minutes at approximately 160° C.

With the objects of the invention in view, there is also provided a process for producing a baked bread crumb product including the steps of baking bread crumbs with sugar to form a baked mixture, subsequently mixing vegetable fat with the baked mixture to form an intermediate product, and roasting the intermediate product for between approximately 10 and approximately 30 minutes at between approximately 140° C. and approximately 180° C.

With the objects of the invention in view, there is also provided a process for producing a baked bread crumb product including the steps of baking bread crumbs with sugar to form a baked mixture, the sugar content being between 2 and 6 percent by weight of the amount of the bread crumbs, subsequently mixing vegetable fat with the baked mixture to form an intermediate product, and roasting the intermediate product for between approximately 10 and approximately 30 minutes at between approximately 140° C. and approximately 180° C.

With the objects of the invention in view, there is also provided a process for producing a baked bread crumb product including the steps of baking bread crumbs with sugar for between approximately 25 and approximately 50 minutes at between approximately 215° C. and approximately 245° C. to form a baked mixture, subsequently mixing vegetable fat with the baked mixture to form an intermediate product, and roasting the intermediate product for between approximately 10 and approximately 30 minutes at between approximately 140° C. and approximately 180° C.

With the objects of the invention in view, there is also provided a process for producing a baked bread crumb product including the steps of baking bread crumbs with sugar to form a baked mixture, subsequently mixing vegetable fat with the baked mixture to form an intermediate product, the vegetable fat content being between approximately 14 and approximately 23 percent by weight of the baked mixture, and roasting the intermediate product for between approximately 10 and approximately 30 minutes at between approximately 140° C. and approximately 180° C.

With the objects of the invention in view, there is also provided a baked bread crumb product including a mixture of bread crumbs and sugar baked together forming a baked mixture and a mixture of vegetable fat and the baked mixture forming an intermediate product, the intermediate product being roasted and having a reddish-brown coloration characteristic of frying.

With the objects of the invention in view, there is also provided a baked bread crumb product including a mixture of bread crumbs and sugar baked together forming a baked mixture and a mixture of vegetable fat and the baked mixture forming an intermediate product, the intermediate product being roasted for between approximately 10 and approximately 30 minutes at between approximately 140° C. and approximately 180° C.

With the objects of the invention in view, there is also provided a baked bread crumb product including a mixture of bread crumbs and sugar baked together forming a baked mixture, the sugar being between approximately 2 and approximately 6 percent by weight of the bread crumbs and a mixture of vegetable fat and the baked mixture forming an intermediate product, the intermediate product being roasted for between approximately 10 and approximately 30 minutes at between approximately 140° C. and approximately 180° C.

With the objects of the invention in view, there is also provided a baked bread crumb product including a mixture of bread crumbs and sugar baked together for between approximately 25 and approximately 50 minutes at between approximately 215° C. and approximately 245° C. forming a baked mixture and a mixture of vegetable fat and the baked mixture forming an intermediate product, the intermediate product being roasted for between approximately 10 and approximately 30 minutes at between approximately 140° C. and approximately 180° C.

With the objects of the invention in view, there is also provided a baked bread crumb product including a mixture of bread crumbs and sugar baked together forming a baked mixture and a mixture of vegetable fat and the baked mixture forming an intermediate product, the vegetable fat being between approximately 14 and approximately 23 percent by weight of the baked mixture, the intermediate product being roasted for between approximately 10 and approximately 30 minutes at between approximately 140° C. and approximately 180° C.

The present invention allows the production of oven-baked bread crumbs from common commercial bread crumbs with the reddish-brown coloration characteristic of fried bread crumbs but without having been fried. This is in contrast to known breaded foods that can achieve this color only after having being fried in oil or grease. Foods, such as meat, fish, or vegetables coated with the oven-baked bread crumbs according to the present invention need not—as is required with prior art bread crumbs—be slowly pre-cooked or pre-baked to have the corresponding pre-coloring. Accordingly, an energy-involved production step during the production of meals for bulk consumers (a step associated with significant cost), such as restaurant chefs, snack booths, large kitchens, catering businesses, and airlines is eliminated.

Because of the present invention, the end consumer does not require pans or deep fryers for achieving the fried "look" and, instead, can finish cooking by baking the products in common ovens, such as convection ovens.

Other features that are considered as characteristic for the invention are set forth in the appended claims.

Although the invention is described herein as embodied in a process for producing a baked bread crumb product and the baked bread crumb product produced by the process, it is, nevertheless, not intended to be limited to the details described because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments.

DESCRIPTION OF THE PREFERRED EMBODIMENTS

To ensure that the added sugar does not form lumps with the bread crumbs, preferably, the starting material used for the baking oven bread crumb is extra dry bread crumbs. The amount of sugar added can be between 2 and 6%, in particular, 4%, of the starting amount of the bread crumbs.

The first process step in which the bread crumbs is baked with the added sugar advantageously lasts between 25 and 50 minutes at a temperature between 215° C. and 245° C., in particular, for 40 minutes at 230° C. in the case where an extra dry bread crumbs is used.

The amount of vegetable fat added is, for a bread crumb to be produced in a preferred manner, between 14 and 25 percent by weight, in particular, 17 percent by weight, of the starting amount of baked bread crumbs-sugar mixture.

The roasting operation in the third process step is performed according to the invention in a continuous-flow drying system, and is performed over a period of 10 to 30 minutes at a temperature between 140° C. and 180° C., in particular, for 20 minutes at 160° C.

I claim:

1. A process for producing a baked bread crumb product, which comprises:

baking bread crumbs with sugar to form a baked mixture;

subsequently mixing vegetable fat with the baked mixture to form an intermediate product; and roasting the intermediate product to produce a coloration characteristic of frying.

2. The process according to claim 1, wherein the coloration characteristic of frying is produced because of the presence of the sugar.

3. The process according to claim 1, wherein the bread crumbs are extra dry bread crumbs.

4. The process according to claim 1, wherein an amount of the sugar in the baking step is between 2 and 6 percent by weight of the amount of the bread crumbs.

5. The process according to claim 1, wherein an amount of the sugar in the baking step is approximately 4 percent by weight of the amount of the bread crumbs.

6. The process according to claim 1, which further comprises carrying out the baking step for between 25 and 50 minutes at between 215° C. to 245° C.

7. The process according to claim 1, which further comprises carrying out the baking step for 40 minutes at 230° C.

8. The process according to claim 1, wherein an amount of the vegetable fat added in the mixing step is between 14 and 23 percent by weight of the baked mixture.

9. The process according to claim 1, wherein an amount of the vegetable fat added in the mixing step is 17 percent by weight of the baked mixture.

10. The process according to claim 1, which further comprises carrying out the roasting step in a continuous-flow drying system.

11. The process according to claim 1, which further comprises carrying out the roasting step for between 10 and 30 minutes at between 140° C. and 180° C.

12. The process according to claim 1, which further comprises carrying out the roasting step for 20 minutes at 160° C.

13. A process for producing a baked bread crumb product, which comprises:

baking bread crumbs with sugar to form a baked mixture;

subsequently mixing vegetable fat with the baked mixture to form an intermediate product; and roasting the intermediate product for between 10 and 30 minutes at between 140° C. and 180° C.

14. A process for producing a baked bread crumb product, which comprises:

baking bread crumbs with sugar to form a baked mixture, the sugar content being between 2 and 6 percent by weight of the amount of the bread crumbs;

subsequently mixing vegetable fat with the baked mixture to form an intermediate product; and roasting the intermediate product for between 10 and 30 minutes at between 140° C. and 180° C.

15. A process for producing a baked bread crumb product, which comprises:

baking bread crumbs with sugar for between 25 and 50 minutes at between 215° C. and 245° C. to form a baked mixture;

subsequently mixing vegetable fat with the baked mixture to form an intermediate product; and roasting the intermediate product for between 10 and 30 minutes at between 140° C. and 180° C.

16. A process for producing a baked bread crumb product, which comprises:

baking bread crumbs with sugar to form a baked mixture;

subsequently mixing vegetable fat with the baked mixture to form an intermediate product, the vegetable fat content being between 14 and 23 percent by weight of the baked mixture; and roasting the intermediate product for between 10 and 30 minutes at between 140° C. and 180° C.

* * * * *